R. H. MOORE.
METHOD AND APPARATUS FOR WASHING AND TREATING SILICA.
APPLICATION FILED AUG. 29, 1917.
1,366,582.
Patented Jan. 25, 1921.
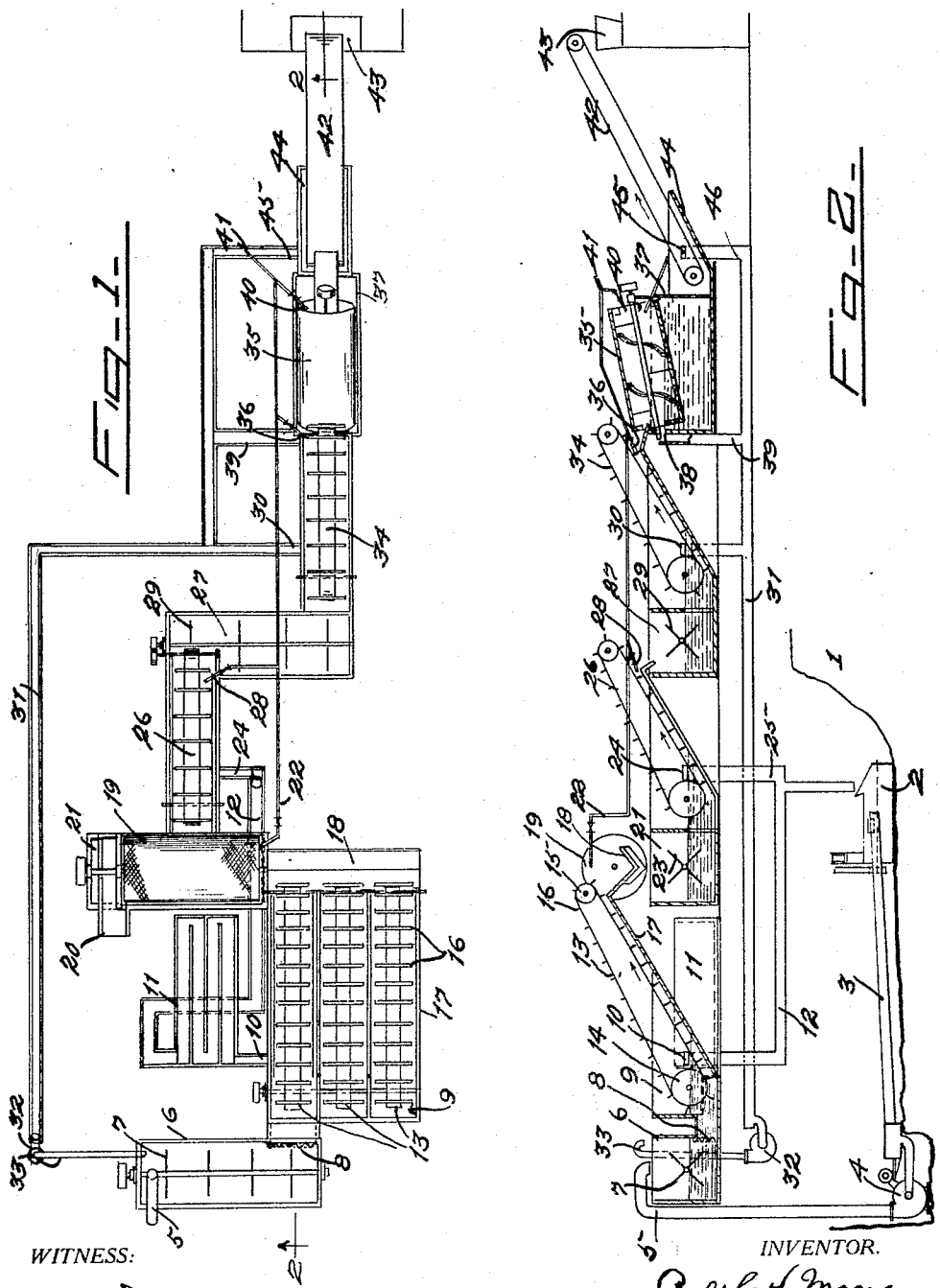
WITNESS:
INVENTOR.
Ralph H. Moore
BY
ATTORNEYS.

UNITED STATES PATENT OFFICE.

RALPH H. MOORE, OF BERKELEY, CALIFORNIA.

METHOD AND APPARATUS FOR WASHING AND TREATING SILICA.

1,366,582.　　　Specification of Letters Patent.　　Patented Jan. 25, 1921.

Application filed August 29, 1917. Serial No. 188,728.

*To all whom it may concern:*

Be it known that I, RALPH H. MOORE, a citizen of the United States, residing at Berkeley, in the county of Alameda and State of California, have invented certain new and useful Improvements in Methods and Apparatus for Washing and Treating Silica, of which the following is a specification.

The present invention relates to a method of washing and refining silica, and to an apparatus for carrying out the various steps of said method.

The object of the invention is to refine a natural ore which contains silica and kaolin, to extract these two constituents in substantially pure form, and to this end the invention comprises broadly a method of washing the ore and agitating the same in the presence of water to break up the kaolin and to free the same from the grains of silica, and to then float off the kaolin in the water. By means of my invention I am enabled to treat a natural product containing about 30% of clay and about 65% silica and to recover both products in a substantially pure state, the final sand containing approximately 97% silica. The clay as recovered is of a very high grade and may be used commercially. The silica is also of a high grade and is well adapted for use in making glass, a use which requires an extremely high-grade product almost absolutely free of clay or other impurities.

I am aware that changes within the scope of the claims hereto appended may be made in the various steps of my method and in the details of construction of the apparatus for carrying out the method as is hereinafter described and illustrated, without in any manner departing from the spirit of the invention.

With this in view, the invention will now be described with reference to the accompanying drawings, wherein—

Figure 1 is a plan view of a preferred form of apparatus for carrying out my invention.

Fig. 2 is a sectional elevation of the same taken on the line 2—2 of Fig. 1, and viewed in the direction of the arrows.

In the drawings, the reference numeral 1 designates a body of ore which is being mined. The ore as dug out from this body, is dumped into a sluice-box 2 and therein mixed with water and allowed to flow through a trough or flume 3 to a pump 4, by which it is elevated through a pipe 5 and dumped into a mixing or washing tank 6. In this tank the material is violently agitated by a rotary paddle 7 to break up the ore and to remove the major portion of the clay adhering to the silica. The material, which is now in the form of a thin mud, is allowed to run out of the mixing tank 6 through a comparatively coarse screen 8, and into the lower portion of a triple elevator 9. An overflow pipe 10 conducts the liquid portion of the mud out of the elevator tank 9 and into a series of settling chambers 11 and thence back through the pipe 12 into the sluice-box 2. The liquid portion of the mud in the elevator tank 9 contains kaolin in suspension, and this kaolin passes out along with the water through the overflow outlet 10 and is recovered from said water in the settling chambers 11.

The heavier material in the elevator tank 9, that is, the silica, with the remaining portion of the kaolin adhering thereto, is carried upward by a triple elevator comprising three endless slat conveyers 13 running over end drums 14 and 15 and provided with downwardly projecting slats or flights 16 adapted to operate in close relation with inclined troughs or floors 17. These conveyers, as will be clearly seen from the drawings, collect the silica and the heavier portions of the solid material from the bottom of the elevator tank 9 and carry the same up along the inclined troughs 17 and dump the same into a transversely disposed and slightly inclined trough 18.

From the trough 18 the material flows into a rotary screen 19, in which the larger particles are removed and discharged through a trough 20 while the finer particles are allowed to fall through into a second mixing tank 21. The interior of the rotary screen 19 is sprayed and washed by a jet of water issuing from a pipe 22. In the mixing tank 21 the sand is again agitated by a paddle 23 in the presence of water and a further portion of the adhering clay is broken up and removed thereby. An overflow outlet 24 allows the liquid, with the lighter kaolin suspended therein, to be led out of said tank 21 and to be returned through a pipe 25 to the sluice box 2. The amount of kaolin carried off by this washing is so small that no attempt is made to recover the same from the water, but it is allowed to mix with the unwashed material in the sluice box 2 and to be carried through the initial mixing tank 6.

The heavier portion of the material in the tank 21 is carried out of said tank by an elevator 26 formed in a manner identical with the previously described elevator, and is dumped into a third mixing and washing tank 27. During the elevation of the sand by the elevator 26 a jet of water issuing from a nozzle 28 is played upon said elevator to further wash the sand as the same is carried thereby.

In the third mixing tank 27 the sand is again agitated by a paddle 29 in the presence of water and still more of the adhering kaolin is removed therefrom and is carried out with the water through an overflow outlet 30 into a pipe 31 from which it is preferably returned by a pump 32 and a pipe 33 into the first mixing tank 6. A third elevator 34, constructed similarly to the previously described elevators, carries the heavier sand up out of the third washing tank 27 and dumps the same into a rotary washer 35. A jet of water issuing from a nozzle 36 washes the sand during its elevation by the third elevator 34. In the rotary washer 35 the sand is again agitated and washed in water within a tank 37 and the final portion of the adhering kaolin is removed therefrom and allowed to pass out through an overflow outlet 38 and a pipe 39 into the pipe 31. A jet of washing water issuing from a nozzle 40 is allowed to play upon the interior of the rotary washer 35, said nozzle being supplied by a pipe 41 with water from any convenient source, not shown in the drawings. The pipe 41 also supplies the nozzles 22, 28 and 36, as shown in the drawings.

The washed sand, which is almost pure silica is discharged from the upper end of the rotary washer 35 onto any suitable means for conveying the same to any desired place of deposit. In the drawings, I have shown this means as comprising a belt conveyer indicated at 42 and adapted to deposit the clean sand into a discharge hopper 43. The water issuing from the upper end of the rotary washer 35 and running off the belt conveyer 42 is caught in a tank 44 surrounding the lower portion of said conveyer and provided with an overflow outlet 45 from which said water is led through a pipe 46 into the return pipe 31.

It is to be understood, that any suitable means may be provided for operating the various movable parts of the apparatus described above, namely, the pumps, the agitating paddles, the elevators, the rotary screen and the rotary washer. It is also to be understood that the sluice-box 2 may be located in any position convenient to the body of ore 1 which is being mined or excavated, and may be moved about to follow the region of excavation of such material. The body of the apparatus however, involving the various members between the first washing tank 6 and the final conveyer 42, is intended to be permanently located, the flume 3 or the pipe 5 being extensible to permit the sluice box 2 to be moved as desired.

It will also be readily understood from the foregoing description that my process consists broadly in breaking up the crude material into its component parts, namely, sand and clay, by means of violent agitation in water. The clay being the more finely divided of the two materials, is carried off in suspension in the washing water, while the sand is picked up from the bottom of the tank and conveyed out by mechanical means. By means of a number of repetitions of this process practically all the clay is removed from the sand and both can be recovered in a substantially pure condition.

Having thus described my invention what I claim as new and desire to protect by Letters Patent is:—

1. In a classifier of the character described, a tank provided with a sorting compartment, stirring means in said compartment for agitating the pulp, said compartment being provided with an overflow, and an independently operated endless conveyer in the tank dipping into the sorting compartment and terminating to one side of the stirring means for conducting the coarse sands from said sorting compartment to a point above the surface of the pulp in the tank.

2. In a classifier of the character described, a tank provided with a sorting compartment, stirring means in said compartment for agitating the pulp, said compartment being provided with an overflow, an independently operated endless conveyer in the tank dipping into the sorting compartment and terminating to one side of the stirring means for conducting the coarse sands from said sorting compartment to a point above the surface of the pulp in the tank, and means for washing the coarse sands as the same are conducted from said compartment.

In testimony whereof I have signed my name to this specification in the presence of two subscribing witnesses.

RALPH H. MOORE.

Witnesses:
W. W. HENRY,
S. CONSTINE.